Nov. 29, 1955  R. E. LAMBERTON  2,725,181
CONTROL SYSTEM FOR TRUCK-MOUNTED COMPRESSORS
Filed Jan. 4, 1952  7 Sheets-Sheet 1
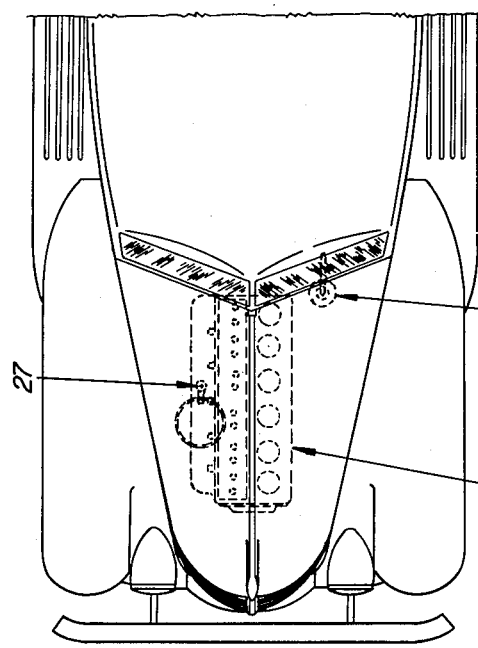
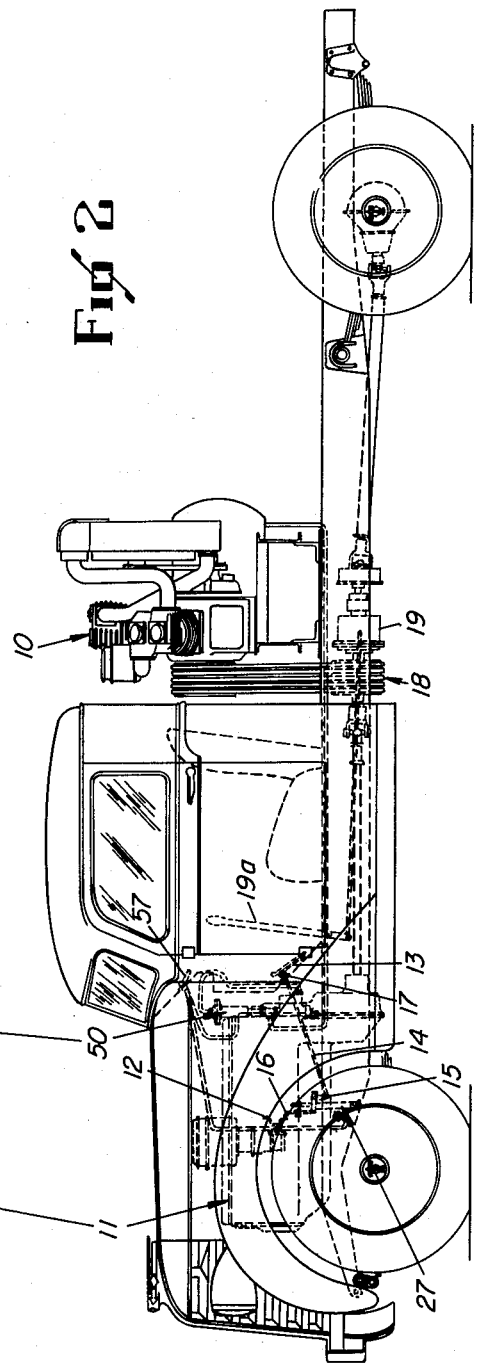
INVENTOR.
Ralph E. Lamberton
BY
ATTORNEYS.

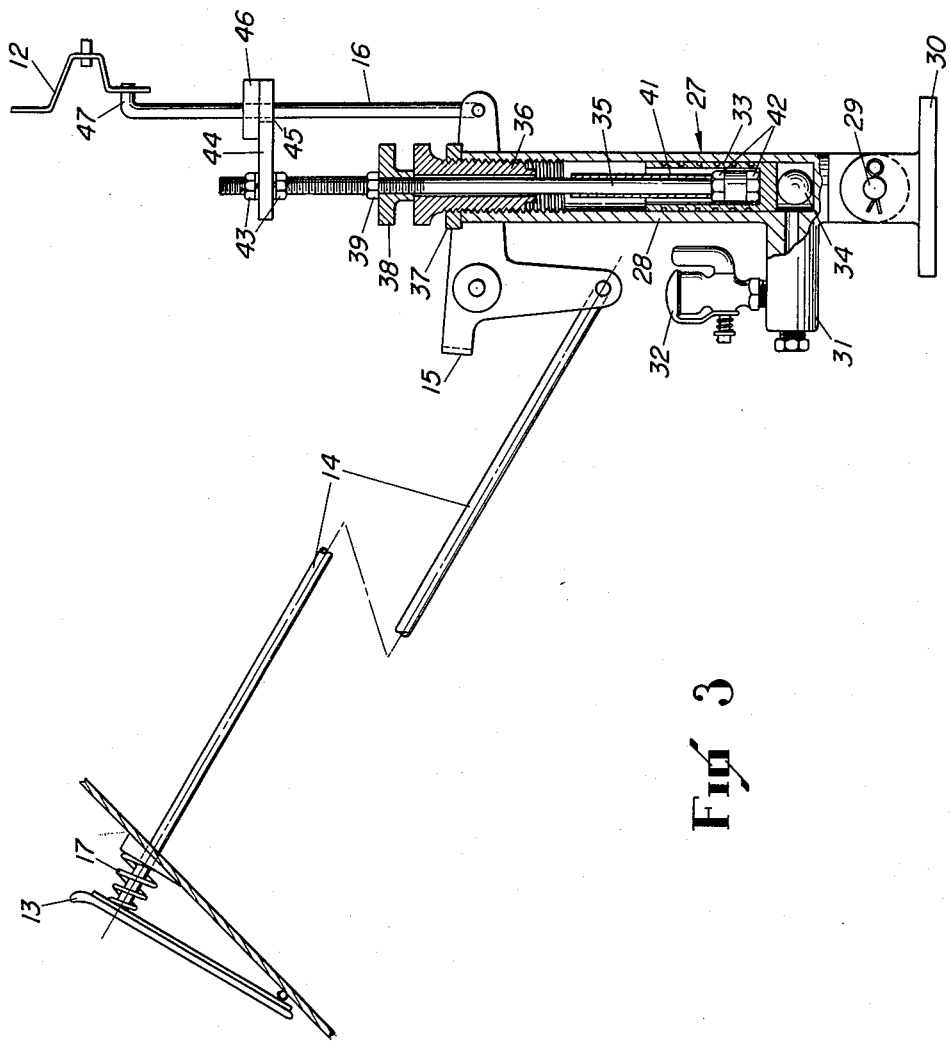

INVENTOR.
Ralph E. Lamberton

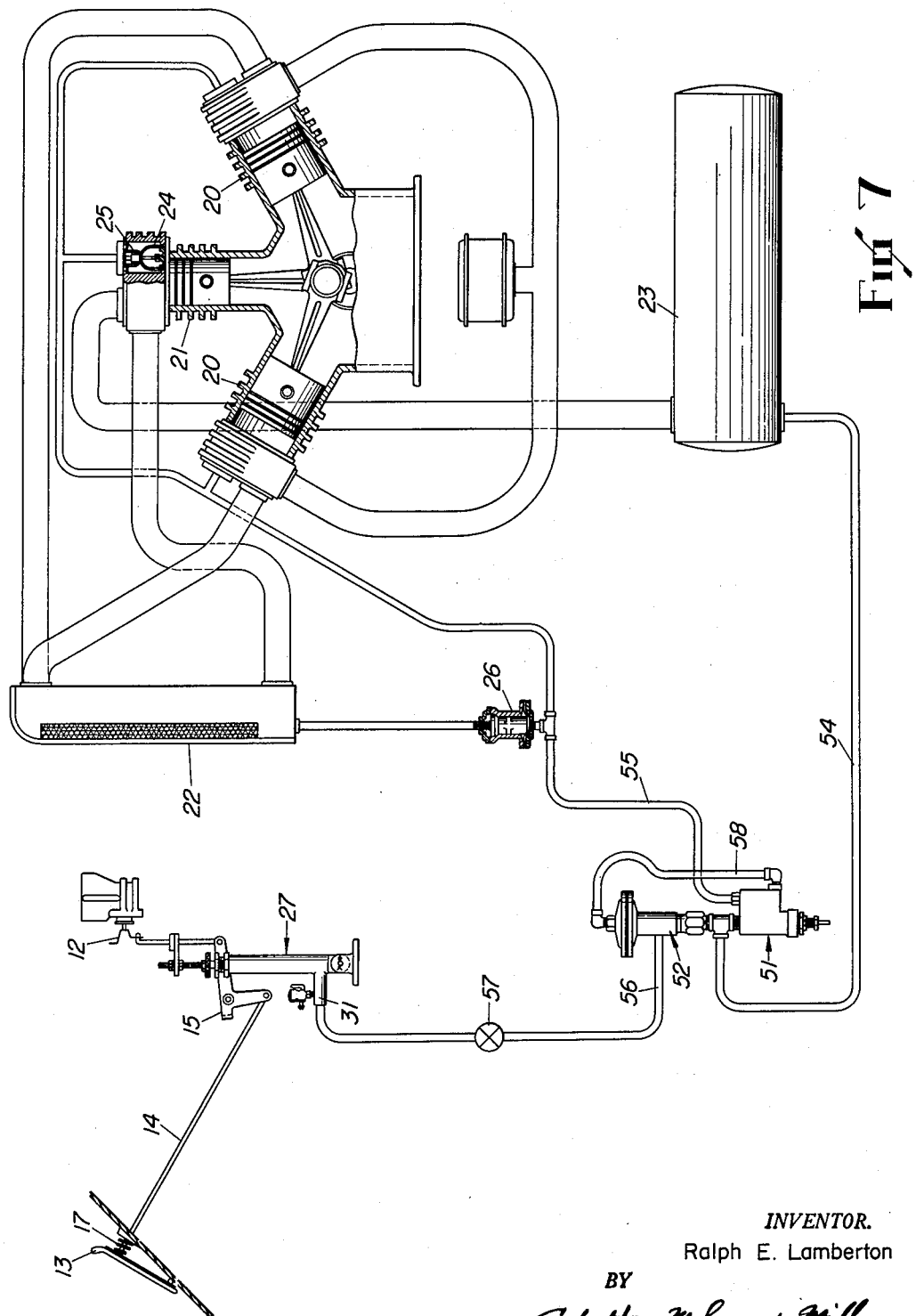

Nov. 29, 1955  R. E. LAMBERTON  2,725,181
CONTROL SYSTEM FOR TRUCK-MOUNTED COMPRESSORS
Filed Jan. 4, 1952  7 Sheets-Sheet 7
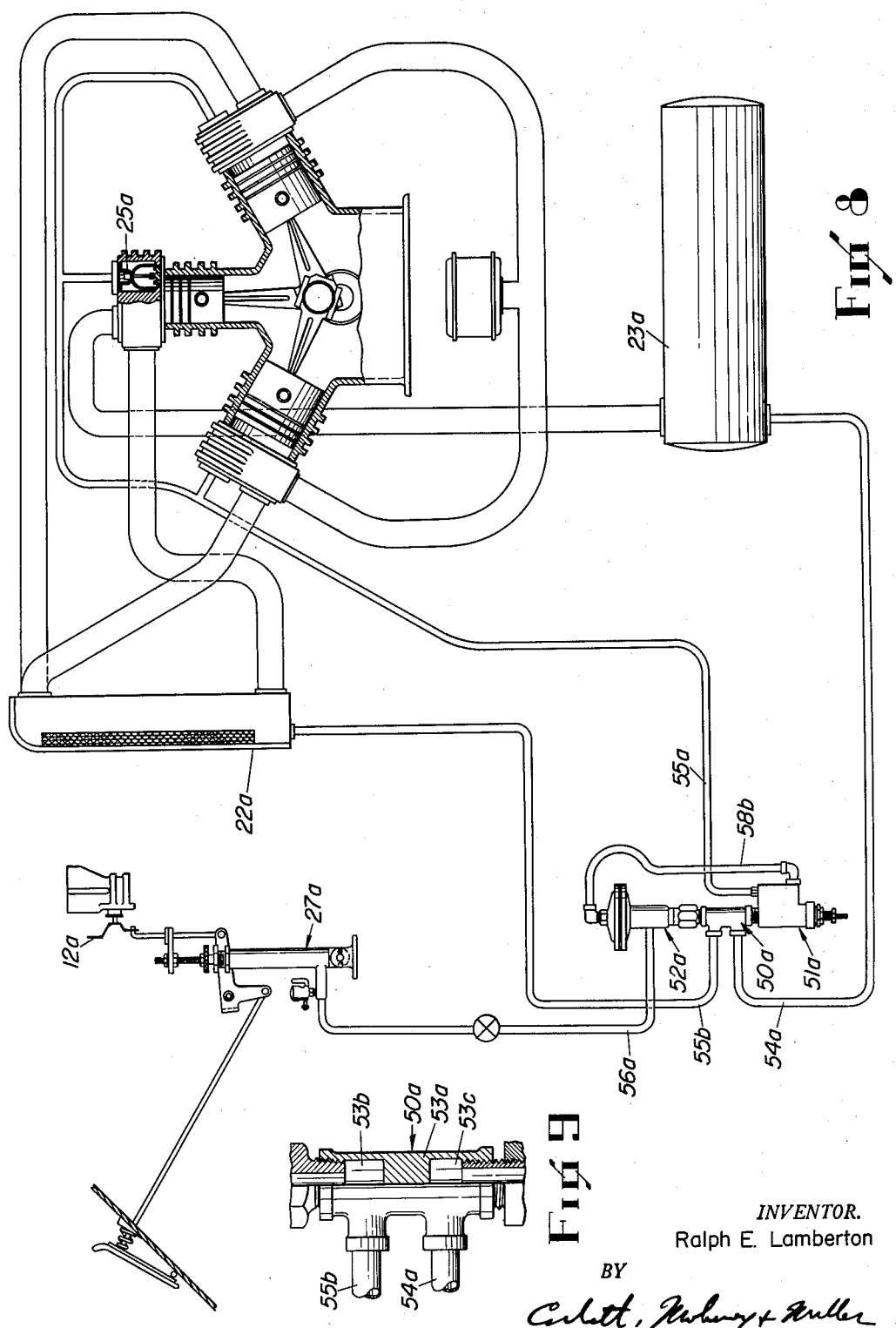
INVENTOR.
Ralph E. Lamberton
BY
*Corlett, Mahoney & Miller*
ATTORNEYS.

United States Patent Office 2,725,181
Patented Nov. 29, 1955

2,725,181

CONTROL SYSTEM FOR TRUCK-MOUNTED COMPRESSORS

Ralph E. Lamberton, Columbus, Ohio, assignor to The Jaeger Machine Company, Columbus, Ohio, a corporation of Ohio Application January 4, 1952, Serial No. 265,033

8 Claims. (Cl. 230—3)

My invention relates to a control system for truck-mounted compressors. It has to do, more particularly, with an automatic control system for regulating the speed of the driving motor of the truck which is used both for propelling the truck and for operating the compressor which is mounted thereon. By the term "truck" as used herein, I intend to cover any vehicle which is self-propelled by an engine that also drives the compressor mounted thereon.

In compressor systems where the air compressor is mounted on a motor-truck, the compressor is driven by the truck engine usually through a power take-off inserted in the drive shaft between the regular truck transmission and the truck differential. This power take-off can be actuated to drive the compressor whenever the motor-truck is stopped. In prior art control systems for compressors of this type, it has been the practice to hold the fuel-supply valve of the truck engine open, to operate it at its peak R. P. M. when the compressor is loaded, by means of a spring and to use the air receiver pressure of the compressor to actuate a pneumatic mechanism for returning the fuel valve to an idling position so that the engine will operate at an idling speed when the compressor is unloaded. In adapting this type of prior art control to a truck engine between the foot throttle and fuel-supply valve, considerable difficulty is encountered and complicated control structures result since it is necessary to provide extra springs, latchout mechanisms for rendering the compressor control inoperative when the truck is being driven and for rendering the foot throttle control mechanism inoperative when the compressor is being operated, and other complicated mechanisms, in order for the compressor control system to regulate engine and compressor speed in accordance with compressed air demand, when the compressor is being used, and for such system not to interfere with normal or driving truck engine control by means of the usual foot throttle. This prior art type of control system requires a different design or arrangement of parts for each different manufacture of truck. Furthermore, this type of system is a continual source of trouble to the operator due to the fact that he must actuate the latchout mechanism at the proper times, there is considerable wear of parts of the complicated mechanism, and the parts are continually getting out of adjustment.

One of the objects of my invention is to provide a control system for a truck-mounted compressor which is associated with the foot throttle control mechanism of the truck and is so designed and constructed that it will not interfere with normal operation of the foot throttle when the compressor is not operating and will cooperate with the foot throttle mechanism, without any mechanical changes or adjustments in such mechanism, when the compressor is operating.

Another object of my invention is to provide a control system of the type indicated wherein no mechanical latch-out mechanisms are required for selecting either the compressor control system or the foot throttle control system since the foot throttle control system is not changed and is not affected by the compressor control system and has no effect on the compressor control system during normal operation of the truck but does cooperate with the compressor control system during operation of the compressor.

A further object of my invention is to provide a compressor control system of the type indicated which is very simple yet effective, and which has few moving parts that might wear or get out of adjustment.

A still further object of my invention is to provide a compressor control system which can be applied easily to a truck in association with the foot throttle control mechanism thereof for the fuel supply valve of the engine.

In the following description, I shall refer to an air compressor but it is to be understood that my invention is applicable to other type of fluid compressors. I shall also refer to the control system as being associated with the throttle control for the butterfly valve of the truck engine but it is to be understood that it could be associated with the throttle control for the fuel supply valve of a diesel engine or to any engine speed control device which is normally held in idling speed by means of a spring or similar means.

According to my invention, I provide a compressor control system, including engine speed regulating mechanism, in association with the foot throttle control of a truck engine wherein the air pressure of the compressor system is used to hold the carburetor butterfly valve open or in full-speed position, whenever the air pressure in the compressor system drops to a predetermined minimum and the engine is required to operate at full load R. P. M. to build up the compressor pressure; and wherein the air is vented from the control system, whenever the pressure of the compressor system reaches a predetermined maximum and the compressor unloads, and thereby permits the carburetor butterfly valve to return to such a position that the engine will operate at a predetermined idling speed. My compressor and engine throttle control system is such that when air is vented therefrom, the spring usually associated with the foot throttle control mechanism of the truck, returns the carburetor butterfly valve to the idling position in exactly the same manner in which it would normally operate when the truck operator removes his foot from the foot throttle after depressing it.

The preferred embodiment of my invention is illustrated in the accompanying drawings wherein similar characters of reference designate corresponding parts and wherein:

Figure 1 is a schematic plan view of part of the truck of Figure 2 and showing parts of my compressor control system in association with the truck.

Figure 2 is a schematic side elevational view showing other parts of my compressor control system in association with a truck-mounted compressor.

Figure 3 is a detail, mainly in vertical section, of the throttle control unit of my compressor control system showing it in idling position.

Figure 7 is a diagrammatic view illustrating the control system in association with the compressor system and the foot throttle mechanism of the truck engine.

Figure 8 is a view similar to Figure 7 but showing my control system in association with a different type of compressor.

Figure 9 is a detail in section of a fitting which is a part of the modified diaphragm and pilot valve assembly which is used with the compressor of Figure 8.

Figure 4:
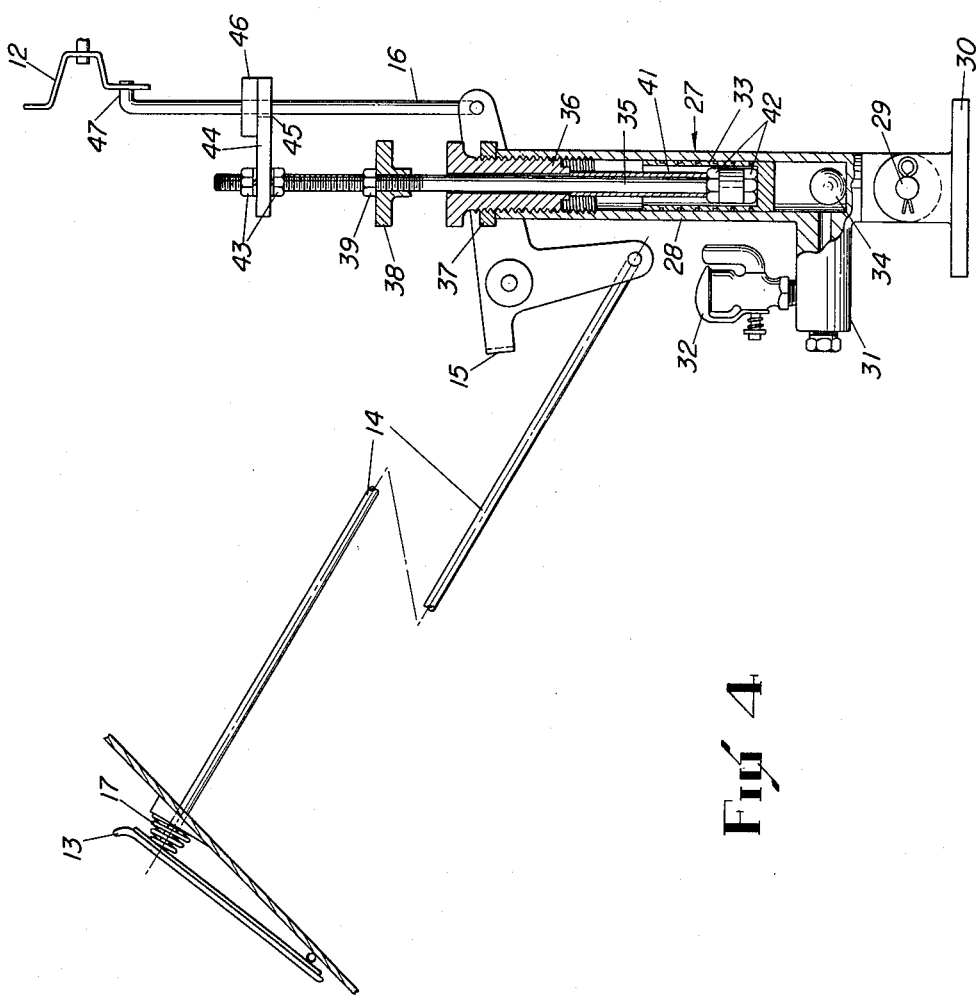
Figure 4 is a view like Figure 3 but showing the throttle control unit in full speed position.

With reference to the drawings, I have shown in Figures 1 and 2, for illustrative purposes, my invention applied to a compressor 10 which is mounted on a truck that includes the driving engine 11. The engine 11, in this example, has associated with it the usual type carburetor which includes the butterfly valve 12. This valve 12 is controlled by the usual foot throttle mechanism which includes the foot pedal 13 (Figures 2, 3 and 4) which has the control rod 14 connected thereto, the opposite end of this rod pivotally connecting to the bell crank lever 15 which is fulcrumed on a suitable support carried by the engine 11. The bell crank lever 15 is also pivoted to the lower end of a vertically disposed valve control rod 16, the upper end of which is connected directly to the butterfly valve 12. This foot throttle mechanism acts in the usual manner to control valve 12, depressing of the pedal 13 serving to open the valve and a compression spring 17, under the pedal and around rod 14, serving to return the valve 12 to idling position as soon as pressure on pedal 13 is released.

The compressor 10 is driven by means of a drive 18 from a power take-off unit 19 (Figure 2) which is interposed in the drive shaft between the truck transmission and differential. The power take-off unit 19 can be controlled to selectively connect the drive shaft with the differential or drive 18 in the usual manner by means of lever 19a in the truck cab. However, the compressor could be driven directly from the engine.

The compressor 10 may be of the usual type and my invention is not limited to any particular type but for purpose of illustration I have shown it in Figure 7 as being of a type having three cylinders, that is, two low-pressure cylinders 20 and a single high-pressure cylinder 21. Connected between the high pressure and low pressure cylinders as indicated is the intercooler 22. The compressor shown also includes the air-receiver 23 which receives air from the high-pressure cylinder 21. Each cylinder is provided with a set 24 of inlet valves and associated with each set of these valves is an unloading mechanism 25. Connected to the intercooler 22 and to the unloading mechanisms 25 of the cylinders is the intercooler relief valve 26. The inlet valves 24 with their associated unloading mechanism and the intercooler relief valve 26 are of the usual type employed in compressor systems and will not be described in detail.

Directly adjacent the butterfly valve 12 I provide the throttle control unit 27 (Figures 1 and 2). This unit 27 is shown in detail in Figures 3 and 4. It comprises the vertically disposed tube 28 which is removably attached by a bolt and cotter key 29 to a bracket 30 which may be welded or otherwise secured to the engine support or truck frame. The lower end of the tube 28 is provided with an air passage extension 31 through which air under pressure will enter the tube 28 at the proper time. This extension 31 is provided with a lubricating oil-cup 32.

Within the tube 28, I provide the vertically movable hollow piston 33. The lowermost position of piston 33 is determined by a ball 34, provided in the lower end of tube 28, so that the pressure inlet into the tube will never be closed by the piston. The lower end of a rod 35 is loosely disposed within the hollow piston. This rod passes slidably upwardly through a bore in an adjusting stop sleeve 36 which is threaded into the upper end of the tube 28 and which has threaded thereon a lock collar 37 that engages the upper end of tube 28. The upper portion of rod 35 is also threaded to receive an adjusting screw nut 38 which is locked in adjusted position by lock nut 39. The screw nut 38 engages the upper end of stop sleeve 36 to limit downward movement of rod 35. Upward movement of rod 35 is limited by means of stop sleeve 41, disposed on rod 35 above stop nuts 42, the upper end of which will engage the lower end of sleeve 36.

The upper end of the rod 35 has rigidly secured thereto by clamping nuts 43, a horizontal bar or link 44. This bar extends to a point where the butterfly valve control rod 16 can extend slidably through an opening 45 formed therein. Above the bar 44 the rod 16 carries a stop collar 46 which is brazed or welded on rod 16 and normally engages the upper surface of this bar. The inturned upper end 47 of rod 16 is connected to the butterfly valve 12 in the usual manner as shown in Figures 3 and 4. When the compressor is not operating, the rod 16 may be moved vertically by the foot throttle control without having any effect on the throttle control unit 27 since the rod will merely slide up and down in opening 45 in bar 44. However, when the compressor is operating and when pressure is supplied into tube 28 through the extension 31, the piston 33 is moved upwardly (Figure 4). This pushes piston rod 35 upwardly, lifting bar 44 which pushes against stop 46 and lifts rod 16 thereby opening the butterfly valve 12 to its full operating speed position. As soon as air pressure is vented from the lower end of tube 28 through extension 31, the parts of unit 27 will return to the positions shown in Figure 3. This will permit the spring 17, associated with the foot throttle mechanism, to return the butterfly valve 12 to its idling position by moving the control rod 16 downwardly, it being understood that bar 44 has been permitted to move downwardly by downward movement of piston 33. At this time stop screw nut 38 is in engagement with stop sleeve 36. The idling speed of the compressor is adjusted by varying the position of screw nut 38 on rod 35 to adjust the initial vertical position of bar 44. The full speed position can be varied by adjusting the stop sleeve 36 into and out of the tube 28 to adjust the final vertical position of bar 44. The stop sleeve 36 is used to adjust the throttle control unit 27 for correct maximum engine speed to operate the compressor properly, but does not in any way affect the foot throttle operation for higher engine speed when operating the truck, as rod 16 will slide freely in the hole 45 in bar 44 as the rod is moved farther upwardly by the foot throttle.

The unit 27 is adapted to be actuated to full-speed position whenever the air demands on the compressor 10 reduce the pressure in the compressor system to a predetermined minimum and require full speed operation thereof; and is adapted to be deactuated to idling speed position whenever the air pressure in the compressor system reaches a predetermined maximum and the compressor unloads. For controlling the unit 27, I provide a diaphragm and pilot valve assembly 50 which is preferably disposed in association with the engine 11 as shown in Figures 1 and 2. This assembly is shown in detail in Figures 5 and 6 and includes a lower pilot valve 51 and an upper diaphragm control valve 52 which are connected to a common fitting 53. The fitting 53 is connected by lines 54 (Figure 7) to the air receiver 23. The pilot valve 51 is connected by line 55 to the intercooler relief valve 26. The diaphragm valve 52 has a line 56 connected at its side and this line is connected to fitting 31 of unit 27. In the line 56 is a two-way control valve 57 which may be mounted in the cab of the truck (Figure 2) and which, when closed, will render my compressor control system inoperative. Obviously, this valve 57 will be closed during normal or driving operation of the truck. The top side of the diaphragm valve 52 is connected by a branch line 58 to the pilot valve 51.

The pilot valve 51 controls the loading and unloading of the compressor cylinders. It is provided with a main L-shape passageway 59 (Figures 5 and 6) which connects the fitting 58a for the line 58 with fitting 53 that connects with line 54. A piston 62 controls this passageway, being mounted for guided vertical movement in the vertical part of the passageway by guide rings 68c, and has its upper end normally in contact with a seat 62a formed in the passageway. The piston is held in this position by means of a pin 60 which is disposed within the hollow lower end of the piston. A spring 61 surrounds the pin 60 and normally forces it upwardly to keep the piston 60a on the seat 62a. The lower end of the spring 61 is in engagement with an adjusting sleeve nut 63 which is threaded upwardly into a sleeve 64 that, in turn, is threaded upwardly into the valve housing. Between the outer flange 64a of the sleeve 64 and the valve housing, shims 65 may be provided. Threaded on the sleeve 63 and engaging the flange 64a of sleeve 64 is a lock nut 66. It will be noted that the sleeve nut 63 is provided with a passageway 63a extending therethrough around the outer end of pin 60 which projects outwardly therethrough. This passageway 63a communicates with the interior of sleeve 64. When the piston 62 is forced downwardly by air pressure in line 54, its lower end is adapted to move into contact with a lower seat 62b which is formed on the inner end of the sleeve 64 and this prevents escape of air through passage 63a but allows it to flow past the piston and into passageway 59. Rings 68c are provided with milled slots to permit free air passage past the piston.

A branch passageway 59a connects the passageway 59 with sleeve fitting 70 which connects line 55 to valve 51 and which is controlled by a delay valve which includes a ball 67 which normally seats on a seat 67a that is formed in passageway 59a. Pressure in the line 55 will seat the ball 67 on its seat 67a. However, a by-pass passageway 69 is provided for allowing some air to by-pass the seated ball 67 and continue on through passage 59a into passage 59. This by-pass is controlled by means of a screw or needle 71 which is threaded into the side of passageway 59a and which is locked in adjusted position by means of a lock nut 71a. This delay valve is adapted to control the flow of air from the compressor inlet valve unloading mechanisms 25 to the pilot valve 51. The purpose of this valve is to allow air to flow freely into line 55 to the inlet valve unloading mechanisms 25 and to the intercooler relief valve 26 when the compressor unloads, since ball 67 will be lifted from its seat; but to restrict the escape of air from the line 55, also from mechanisms 25 and valve 26, when pressure in the air receiver 23 drops to a predetermined minimum, since such air must escape through by-pass 69. The time delay interval can be adjusted by adjusting the screw 71 in or out, adjusting it in serving to increase the time delay and adjusting it out serving to decrease the time delay. The spring 61 of the pilot valve is set correctly for a selected unloading and loading pressure. To increase the operating pressure, the screw 63 is turned in to increase the force of spring 61 and to decrease it, the screw is turned out to decrease the force exerted by the spring. The lock nut 66 is tightened after each adjustment. To decrease the differential, more of the shims 65 are added and to increase it, some of the shims are removed in order to vary the location of seat 62b and thereby vary the extent of movement of piston 62.

Figure 5:
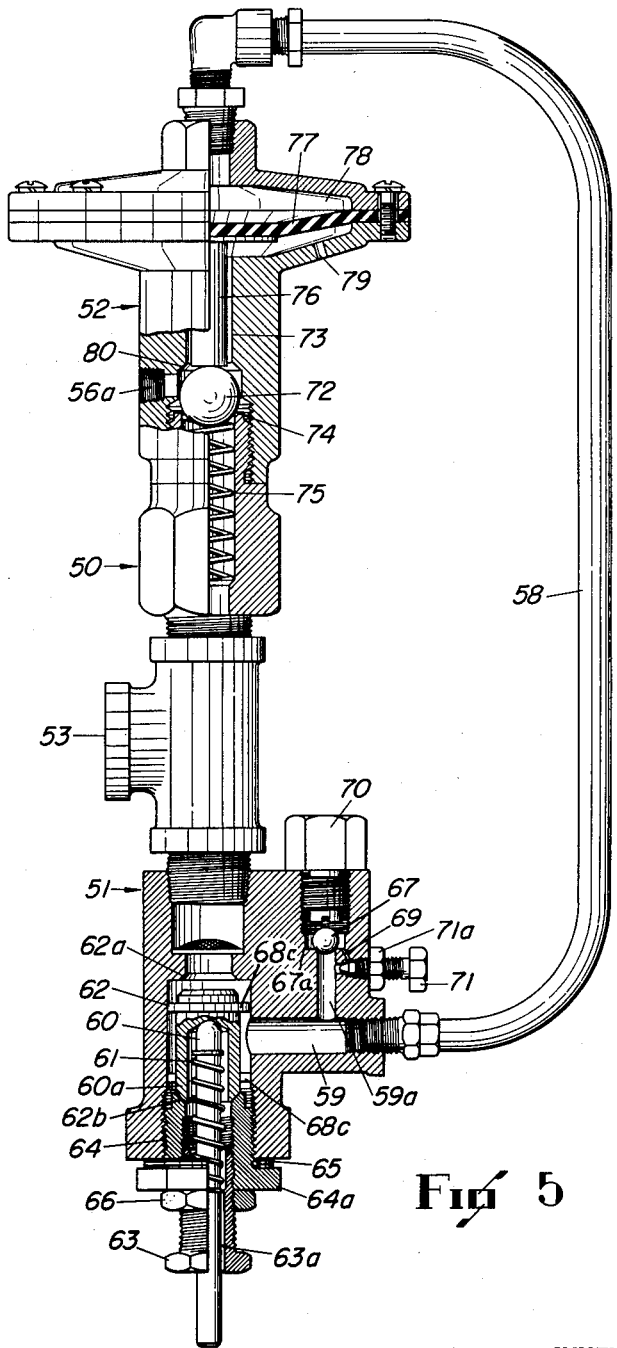
Figure 5 is a detail, mainly in vertical section, of the diaphragm and pilot valve assembly of my compressor control system showing it in idling position.
Figure 6:
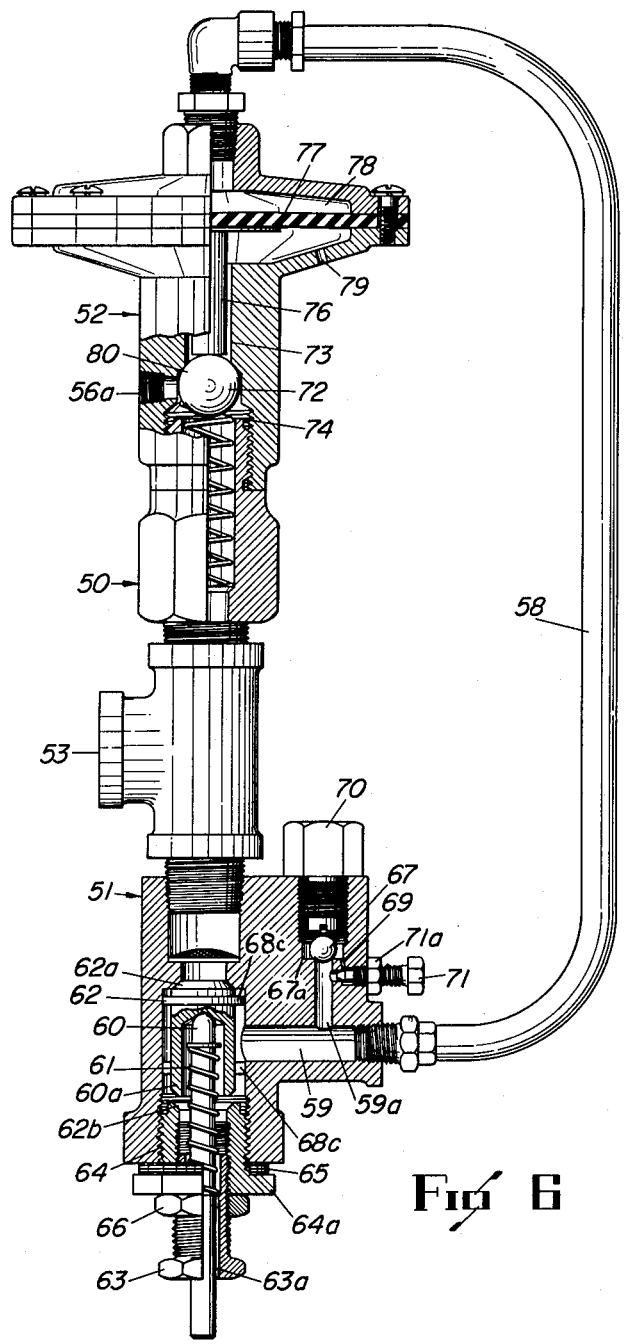
Figure 6 is a view similar to Figure 5 but showing the assembly in full speed position.

The diaphragm control valve 52, as shown in Figures 5 and 6, includes a ball 72 which is disposed in a vertical passage 73 formed therein. This passage has a lower seat 74 formed therein upon which the ball seats when the compressor is unloaded. A compression spring 75 in the lower part of passage 73 tends to lift the ball from the seat 74. When the compressor is unloaded, the ball 72 is held on lower seat 74 by means of a vertical stem 76 disposed in passage 73, the lower end of the stem engaging the ball and its upper end being attached to a flexible diaphragm 77. The diaphragm is clamped in a chamber 78 at the upper end of valve 52. The upper side of this chamber 78 communicates with line 58. The stem 76 is smaller than passage 73 to provide an air passageway around the stem. The lower wall of chamber 78 is provided with air vents 79. The ball 72 is disposed at substantially the same level as the point of connection of line 56 to valve 52 which is through threaded socket 56a. An upper seat 80 is formed in passage 76 at a level which is spaced slightly above the ball 72 when it is seated on the lower seat 74. When the air compressor is unloaded and the throttle control unit 27 is in idling position (Figure 3) the ball 72 is seated by air-receiver pressure applied through line 58 upon the upper surface of diaphragm 77 which flexes it downwardly, causing stem 76 to press ball 72 on its lower seat 74. Receiver pressure vented from throttle control unit 27 through line 56, may then vent through passage 73 around stem 76 and out through vents 79, it being apparent that diaphragm 77 is prevented from closing these vents by contact of stem 76 with the ball 72.

As soon as the pilot valve 51 closes, piston 62 seating on upper seat 62a, due to a drop in air receiver pressure, which lowers pressure in line 54, air is vented immediately from the upper side of diaphragm chamber 78, through line 58, passage 59 and vent passage 63a; and air from the receiver 23 acts through line 54, upwardly through passage 73 (Figure 6) to aid spring 75 in forcing ball 72 off lower seat 74 and upwardly onto seat 80, lifting stem 76 and diaphragm 77. This allows air from the receiver 23 to flow to the throttle control unit 27 through line 56. To actuate such unit so that piston 33 moves upwardly and moves the butterfly valve 12 to operate the engine 11 to drive the compressor at correct full load speed.

Ordinarily, the foot throttle control mechanism, including pedal 13, is operated in the usual manner. Depressing pedal 13 will cause vertical movement of valve control rod 16 in the usual way since it is free to slide upwardly through bar 44. As soon as the foot pressure is released, the spring 17 returns the valve to idling position.

To operate the air compressor 10 after the truck engine 11 is operating, the truck transmission is shifted into high gear and the power take-off 19 is engaged. The engine is speeded up with the foot throttle and the truck clutch is engaged. The control valve 57 in the truck cab is set at operative position. The foot of the operator is kept on the foot pedal 13 until my automatic control system takes over the control of the engine speed which will occur when the pressure in air receiver 23 reaches a predetermined minimum. Thereafter, my control system will run the engine at proper operating speed when the air compressor needs to pump air or will operate the engine at idling speed when the air compressor unloads, depending entirely on the air demand, that is reflected in air receiver pressure.

Automatic regulation of the compressor with my control system is accomplished in the following manner:

When pressure in the air receiver 23 reaches a predetermined maximum, it causes the pilot valve 51 to open and admit air from the air receiver 23 and from line 54, through line 55, to intercooler relief valve 26 and inlet valve unloading mechanisms 25 and at the same time venting receiver air pressure from throttle control unit 27 through line 56, thereby unloading the air compressor by holding the cylinder inlet valves 24 open, relieving intercooler pressure to the atmosphere and idling the engine 11. At this time the assembly 50 will be in the condition shown in Figure 5 and ball 72 will be held down on its lower seat 74. Receiver pressure is, therefore, vented from the lower end of unit 27, through line 56, and vents 79 of the diaphragm valve 52 and the unit 27 will then be in the idling position shown in Figure 3 and butterfly valve 12 will be partially closed.

When pressure in the air receiver 23 drops to a predetermined minimum, the pilot valve 51 closes, shutting off the air supply from the receiver 23 and immediately venting air from diaphragm chamber 78 through line 58 and vent 63a. Any pressure in line 54 together with spring 75 in diaphragm valve 52 immediately pushes up ball 72, as shown in Figure 6, to its upper seat 80, allowing air from the receiver 23 to flow into line 56 and then into the lower end of throttle control unit 27 which it will operate, moving its parts into the positions shown in Figure 4, thereby causing unit 27 to open the butterfly valve 12. The egine 11 will now speed up to proper full operating speed for the compressor. The intercooler relief valve 26 will close since air from line 55 will vent past ball 67 through by-pass 69 of the delay valve and the air from the unloaders 25 will also vent through the by-pass 69 of the delay valve, allowing the inlet valves 24 of the various cylinders to operate so that the compressor begins pumping air into the air receiver 23. The delay valve arrangement provides a time delay so that the compressor 10 will not pump air until the engine 11 has attained normal full load speed and, therefore, prevents the engine from stalling or laboring.

Thus, air pressure in the throttle control unit 27 holds the carburetor butterfly valve 12 open so that the truck engine 11 will run at proper full operating speed for the compressor except when the compressor 10 unloads. When the compressor unloads, air pressure is vented from the throttle control 27, which will permit the spring 17 of the foot throttle control mechanism to move the butterfly valve 12 to partially closed or idling position so that the engine will operate at idling speed. When the pressure in the air receiver 23 drops, the pilot valve 51 vents the air from the diaphragm control valve 52, which will then admit air pressure to the throttle control unit 27, which will open the carburetor butterfly valve 12, allowing the engine to return to full operating speed.

As pointed out before, the engine idling speed is adjusted by turning stop nut 38 and the engine full load speed is adjusted by turning stop screw sleeve 36.

In Figure 8, I illustrate a different type of compressor system with which my control system may be used.

In this type of compressor, my control system is actuated by intercooler pressure rather than receiver pressure. In this compressor the intercooler relief valve 26 is eliminated, the line 55a from the unloading mechanisms 25a of the cylinders connecting directly to the delay valve portion of the pilot valve 51a. The assembly 50a, in this instance, is slightly different since the fitting 53a, as shown in Figure 9, is divided into two separate chambers 53b and 53c. The chamber 53c is connected to line 54a which connects directly to the receiver 23a. On the other hand, the chamber 53b is connected by line 55b directly to the intercooler 22a. The diaphragm chamber is connected to the pilot valve 51a by the line 58b in the same manner as before. Furthermore, the throttle control unit 27a is connected by line 56a to the valve 52a in the same manner as before.

With this compressor, unloading is accomplished when the pressure in the receiver 23a reaches a predetermined maximum and opens the pilot valve 51a through the medium of line 54a. This will then pressurize the line 55a, as before, through the delay valve and allow the unloading mechanisms 25a to function. The pressure in intercooler 22a will also at this time be at a predetermined maximum (first stage) but the pressure in the receiver 23a will be greater. Intercooler pressure will act through line 55b on the lower side of the diaphragm valve 52a and receiver pressure will act on the upper side thereof through line 58b and since the latter is greater, the valve 52a will be closed. Therefore, fluid pressure will not reach throttle control unit 27a and this unit will permit the valve 12a to return to idling position. As soon as pressure in the receiver 23a reaches a predetermined minimum and pilot valve 51a closes, the top of the daphragm chamber is vented and the intercooler pressure (first stage) acting through line 55b will open the valve 52a and will permit intercooler pressure to act through line 56a on the unit 27a to cause it to move the valve 12a into proper position for full load operation of the compressor.

As previously indicated, it is to be understood that my invention is not limited to any particular type of compressor. The two examples illustrated are of the two-stage type but my control system will work equally well in a single stage type where there are no low pressure cylinders and no intercooler. Also my control system is equally applicable to rotary types of compressors. In any compressor to which my invention is applied, the throttle control unit will control the speed of the driving engine, such unit will be controlled by the control valve unit, and the control valve unit will be subjected to predetermined maximum and minimum pressures developed by the compressor to cause the throttle control unit to function to idle the driving engine or speed it up to proper full load speed.

Having thus described my invention, what I claim is:

1. In combination with a self-propelled vehicle having a propelling driving engine and a compressor driven thereby together with throttle mechanism for actuating a fuel-supply valve that controls the supply of fuel to the engine, said compressor including a pilot valve which is set for selected compressor unloading and loading pressures, said throttle mechanism including a yieldable device acting to return the fuel-supply valve to engine idling position; a control system for said compressor, said control system including a fluid-actuated throttle control unit for positioning said fuel-supply controlling valve at one position where the engine will operate at full speed or for permitting said yieldable device to return said fuel-supply controlling valve to its other position where the engine will idle, a connection between said unit and said throttle mechanism which will act positively to move said mechanism toward full speed position but will not act in the opposite direction, and means for subjecting said throttle control unit to fluid pressure of the compressor only when such pressure is at a predetermined minimum so that said connection will move said throttle mechanism into correct full load speed position for the compressor and to vent all the pressure from said unit only when the compressor pressure reaches a predetermined maximum to return said throttle control unit to idling position so as to permit said yieldable device to return said throttle mechanism to idling position, said last-named means comprising a control valve connected to said pilot valve and said throttle control unit and adapted to open upon the application of compressor pressure thereto to supply actuating pressure to said throttle control unit and to vent the throttle control unit when said control valve is relieved of compressor pressure.

2. The combination of claim 1 wherein the throttle mechanism includes an actuating member which is normally held in idling position by said yieldable device which comprises a spring, said throttle mechanism being connected to a rod which actuates the valve, said connection between said fluid-actuated unit and said throttle mechanism comprising a connecting member connected to said rod for moving it toward full-speed position and freely movable relative to said rod in the opposite direction.

3. The combination of claim 2 wherein said throttle mechanism actuating member comprises a foot pedal and the yieldable device comprises a spring for returning the fuel valve normally to idling position.

4. The combination of claim 3 wherein the compressor includes low-pressure cylinder units and high-pressure cylinder units with an intercooler connected therebetween and an intercooler relief valve connected to the unloading mechanism of the cylinder units, to the intercooler and to one side of said pilot valve, said compressor also including a receiver for receiving compressed air from the cylinders, said receiver being connected to the opposite side of said pilot valve.

5. The combination of claim 4 wherein the pilot valve includes a delay valve in the connection between the intercooler relief valve and the pilot valve.

6. The combination of claim 2 wherein the connection between the throttle control unit and the throttle mechanism is adjustable to vary the idling and full load speed positions to which the valve is moved by said fluid-actuated throttle control unit.

7. The combination of claim 3 wherein the compressor includes low-pressure cylinder units and high-pressure cylinder units with an intercooler connected therebetween, said compressor also including a receiver for receiving compressed air from the cylinders, one side of the pilot valve being connected to unloading mechanisms for the cylinders, said receiver being connected to the opposite side of said pilot valve, said intercooler being connected to the side of the control valve opposite to that which is connected to the pilot valve.

8. The combination of claim 7 wherein the pilot valve includes a delay valve which is in the connection between the control valve and the pilot valve.

References Cited in the file of this patent

UNITED STATES PATENTS

| Number | Name | Date |
|---|---|---|
| 1,550,964 | Jones | Aug. 25, 1925 |
| 1,799,180 | Rothman | Apr. 7, 1931 |
| 1,834,593 | Holdsworth | Dec. 1, 1931 |
| 1,834,594 | Holdsworth | Dec. 1, 1931 |
| 1,834,595 | Mercer | Dec. 1, 1931 |
| 2,137,219 | Aikman | Nov. 22, 1938 |
| 2,137,752 | Ferguson | Nov. 22, 1938 |
| 2,171,285 | Baker | Aug. 29, 1939 |
| 2,178,660 | Carpenter | Nov. 7, 1939 |
| 2,212,631 | Baker | Aug. 27, 1940 |
| 2,213,196 | Bartholomew | Sept. 3, 1940 |
| 2,421,872 | Evelyn | June 10, 1947 |
| 2,476,048 | Lamberton | July 12, 1949 |
| 2,651,262 | Mathews | Sept. 8, 1953 |
| 2,651,263 | Mathews | Sept. 8, 1953 |

FOREIGN PATENTS

| Number | Country | Date |
|---|---|---|
| 545,445 | France | Oct. 11, 1922 |